United States Patent
Templeman et al.

(10) Patent No.: US 9,276,243 B2
(45) Date of Patent: Mar. 1, 2016

(54) BATTERY HOLDER AND ISOLATION ASSEMBLY

(71) Applicant: King Products, LLC, Lenexa, KS (US)

(72) Inventors: Jon Clayton Templeman, Overland Park, KS (US); Brock Christian Templeman, Overland Park, KS (US)

(73) Assignee: KING PRODUCTS, LLC, LENEXA, KS (US)

( * ) Notice: Subject to any disclaimer, the term of this patent is extended or adjusted under 35 U.S.C. 154(b) by 0 days.

(21) Appl. No.: 14/475,148

(22) Filed: Sep. 2, 2014

(65) Prior Publication Data

US 2015/0060170 A1 Mar. 5, 2015

Related U.S. Application Data

(60) Provisional application No. 61/872,162, filed on Aug. 30, 2013.

(51) Int. Cl.
*B60R 16/04* (2006.01)
*H01M 2/10* (2006.01)
*B60K 1/04* (2006.01)
*B63B 17/00* (2006.01)

(52) U.S. Cl.
CPC ............... *H01M 2/1083* (2013.01); *B60K 1/04* (2013.01); *B60R 16/04* (2013.01); *B63B 17/00* (2013.01); *H01M 2220/20* (2013.01)

(58) Field of Classification Search
CPC .... H01M 2/10; H01M 2/1016; H01M 2/1072; H01M 2/1077; H01M 2/1083
USPC ................... 180/68.5; 429/163, 176, 177, 187
See application file for complete search history.

(56) References Cited

U.S. PATENT DOCUMENTS 5,534,364 A * 7/1996 Watanabe et al. ............... 429/61
2009/0068551 A1  3/2009 Bernard et al.

FOREIGN PATENT DOCUMENTS

| JP | 06107090 A | 4/1994 |
|---|---|---|
| KR | 2019930016308 U | 7/1993 |
| KR | 2019930016332 U | 7/1993 |

* cited by examiner

*Primary Examiner* — Jeffrey J Restifo
*Assistant Examiner* — Erez Gurari
(74) *Attorney, Agent, or Firm* — Hovey Williams LLP

(57) ABSTRACT

A battery holder for securing a battery to a vehicle and for mechanically isolating the battery from the vehicle is provided. The battery holder includes a vehicle mounting plate, a battery containment plate, and a number of shock absorbing elements. The battery containment plate includes a number of open-topped cells for retaining leaking battery liquid therein. The shock absorbing elements prevent vibrations and shocks from being transferred from the vehicle to the battery.

18 Claims, 4 Drawing Sheets

BATTERY HOLDER AND ISOLATION ASSEMBLY

RELATED APPLICATION

The present application is a non-provisional patent application and claims priority benefit, with regard to all common subject matter, of earlier-filed U.S. provisional patent application titled "BATTERY HOLDER AND ISOLATION ASSEMBLY", Ser. No. 61/872,162, filed Aug. 30, 2013, incorporated by reference in its entirety into the present document.

BACKGROUND

Vehicles such as cars and boats typically include one or more batteries for storing and providing electrical power. These batteries often fail or have reduced performance due to excessive vibrations and shocks generated or transmitted by the vehicles. This is especially true for batteries used in boats, personal watercraft, all-terrain vehicles, and other vehicles that operate in rough water or uneven terrain. All types of batteries, and particularly high performance batteries used in marine applications, are expensive, difficult to replace, and difficult to safely dispose. Thus, prolonging their useful lives is highly desired.

Conventional battery holders such as battery cases secure their batteries to the vehicles but do not absorb vibrations and shocks transmitted or generated by the vehicles. Shock absorbing pads have been developed for placement under the batteries, but the batteries are no longer secured to the vehicles. Strapping the batteries to the vehicles or otherwise securing the batteries to the vehicles while they are on the shock absorbing pads results in the shock absorbing pads being ineffective because vibrations and shocks travel through the securing straps to the batteries.

SUMMARY

The present invention solves the above-described problems and provides a distinct advance in the art of battery holders. More particularly, the present invention provides a battery holder and isolation assembly that both secures a battery to a vehicle and mechanically isolates the battery from the vehicle.

A battery holder and isolation assembly constructed in accordance with an embodiment of the invention broadly includes a vehicle mounting plate, a battery containment plate, a number of spacers, a battery securement component, and a number of shock absorbing elements.

An embodiment of the vehicle mounting plate is formed of corrosion resistant metal or plastic and includes a number of fastener holes for securing the vehicle mounting plate to a surface of the vehicle and for securing the shock absorbing elements to the vehicle mounting plate.

An embodiment of the battery containment plate is formed of corrosion resistant metal or plastic and includes an upper surface, a vertically extending lip, a number of fastener holes, a number of shock absorber wells, and a battery securement component guide. The upper surface includes a number of open-topped cells for retaining any spilled battery liquid. The vertically extending lip extends upward around the upper surface and retains a bottom portion of the battery. The fastener holes receive fasteners of the shock absorbing elements therethrough for securing the battery containment plate to the shock absorbing elements. The shock absorber wells receive the shock absorbing portions of the shock absorbing elements therein.

The spacers restrain the battery from moving horizontally and include a number of protrusions. The protrusions can be inserted into selected open-topped cells of the battery containment plate depending on the battery size. The spacers can be omitted for large batteries.

The battery securement component retains the battery on the battery containment plate and may be any suitable adjustable or elastic securement component.

The shock absorbing elements may be Sorbothane® Stud Mounts, rubber, or other suitable shock-absorbing components. The shock absorbing elements each include a shock absorption portion, a lower fastener, and an upper fastener. The shock absorption portion is formed of Sorbothane® material, rubber, or other suitable material. The lower and upper fasteners are embedded in the shock absorption portion with the shock absorption portion extending between the fasteners. The lower fastener secures the shock absorbing element to the vehicle or vehicle mounting plate and the upper fastener secures the shock absorbing element to the battery containment plate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
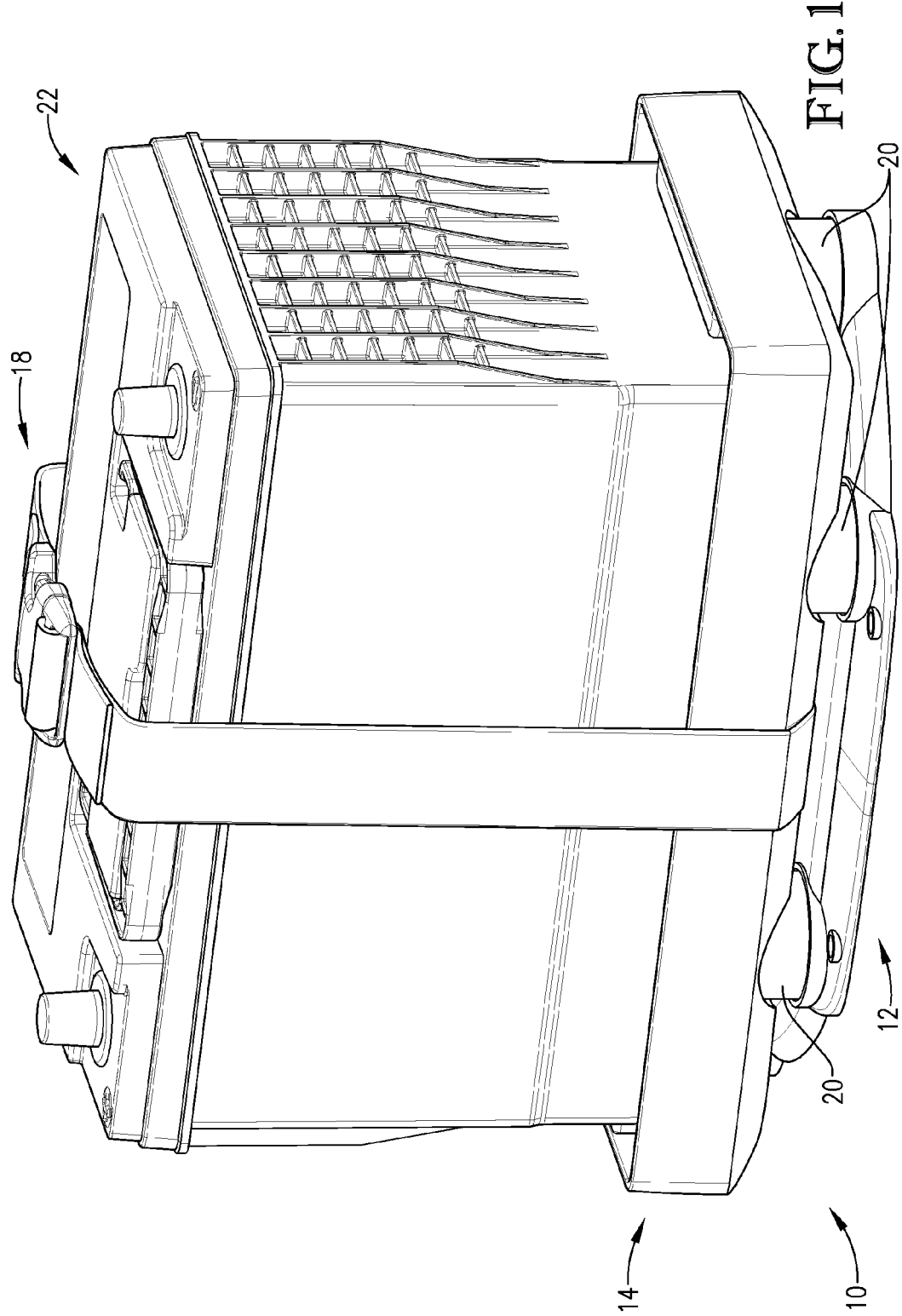
FIG. 1 is a perspective view of a battery holder constructed in accordance with an embodiment of the present invention and shown holding a battery.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, a battery holder 10 constructed in accordance with an embodiment of the present invention is illustrated. The battery holder 10 broadly comprises a vehicle mounting plate 12, a battery containment plate 14, a number of spacers 16, a battery securement component 18, and a number of shock absorbing elements 20.

Figure 3:
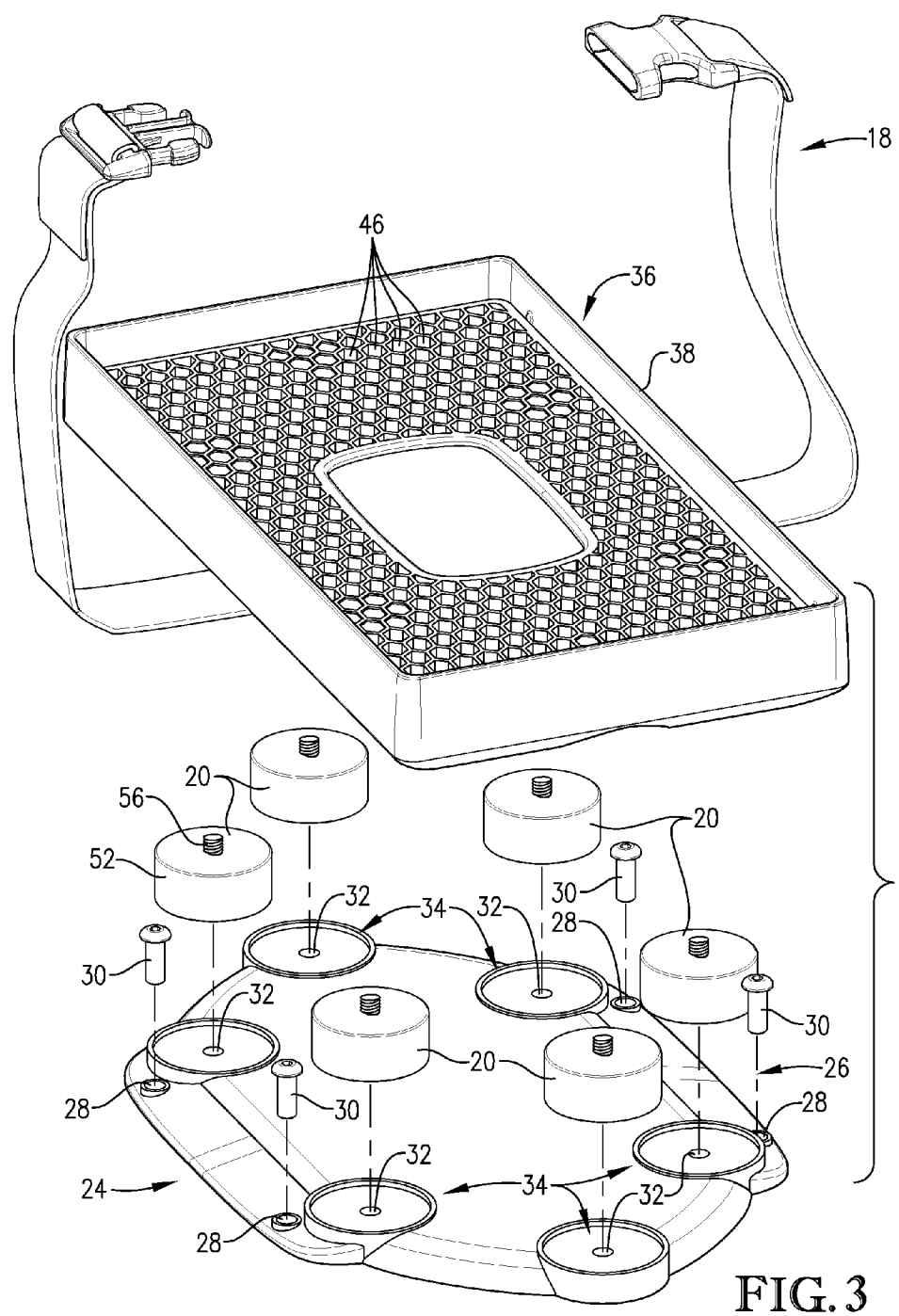
FIG. 3 is an exploded assembly view of the battery holder of FIG. 1.
Figure 4:
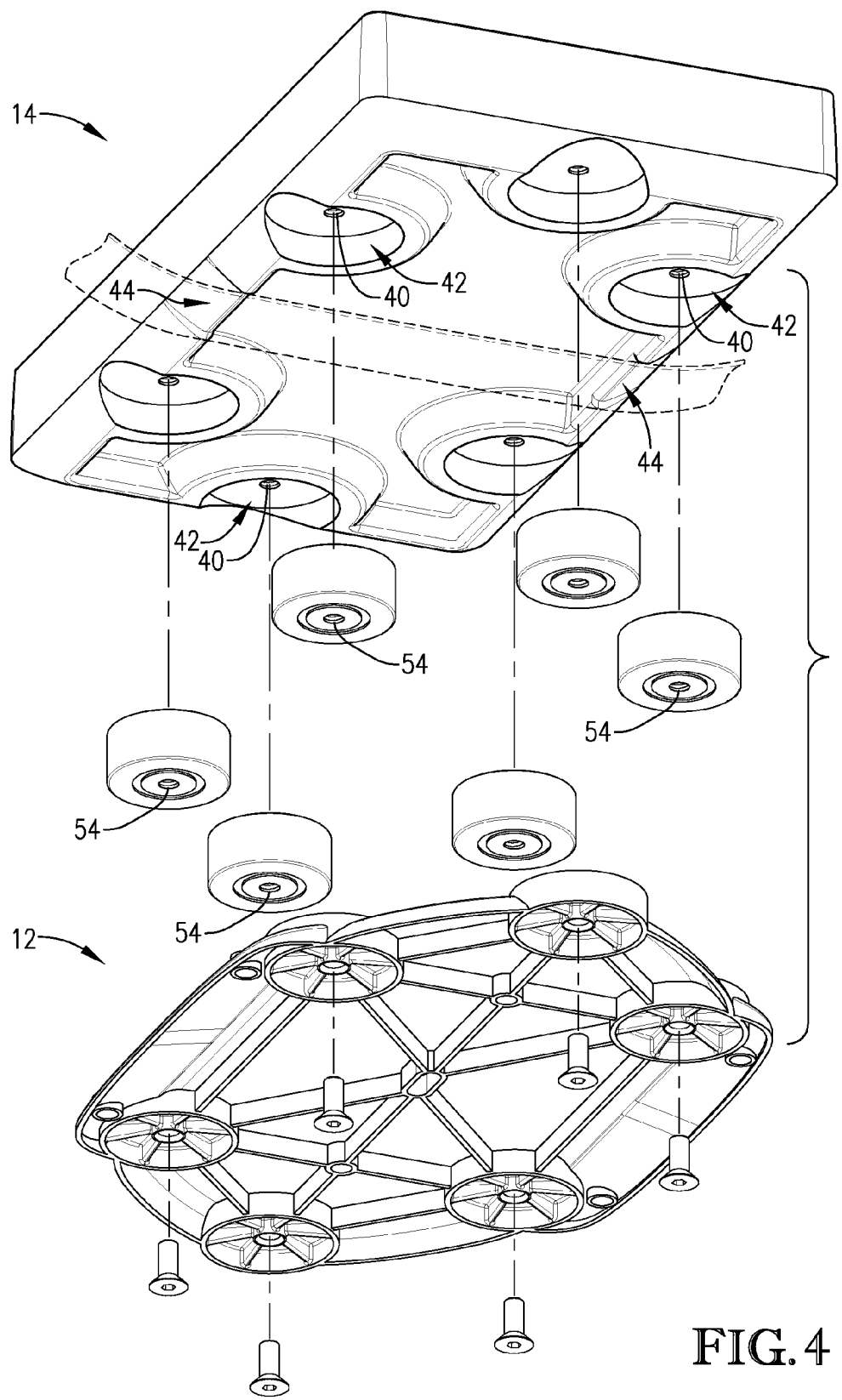
FIG. 4 is bottom exploded assembly view of the battery holder of FIG. 1.

The vehicle mounting plate 12 supports the weight of a battery 22 and the other components of the battery holder 10 on a surface or mounting component of the vehicle and may be formed of corrosion resistant billet aluminum, molded plastic, or any other suitable material. The vehicle mounting plate 12 may be rectangular or oval in shape and includes a tapered front ledge 24, a tapered rear ledge 26, and a plurality of fastener holes 28 extending through the ledges 24, 26 for receiving vehicle mounting fasteners 30 therethrough, as shown in FIGS. 3 and 4. Alternatively, the vehicle mounting plate 12 may be secured to the vehicle via straps, clamps, or other fasteners. The vehicle mounting plate 12 also includes additional fastener holes 32 for receiving shock absorber fasteners therethrough and shock absorber wells 34 for receiving shock absorbing components therein. In one embodiment, the vehicle mounting plate 12 includes six shock absorber wells 34. It will be understood that an alternative configuration of the invention may not use a vehicle mounting plate with the shock absorbing fasteners being secured directly to the vehicle.

Figure 2:
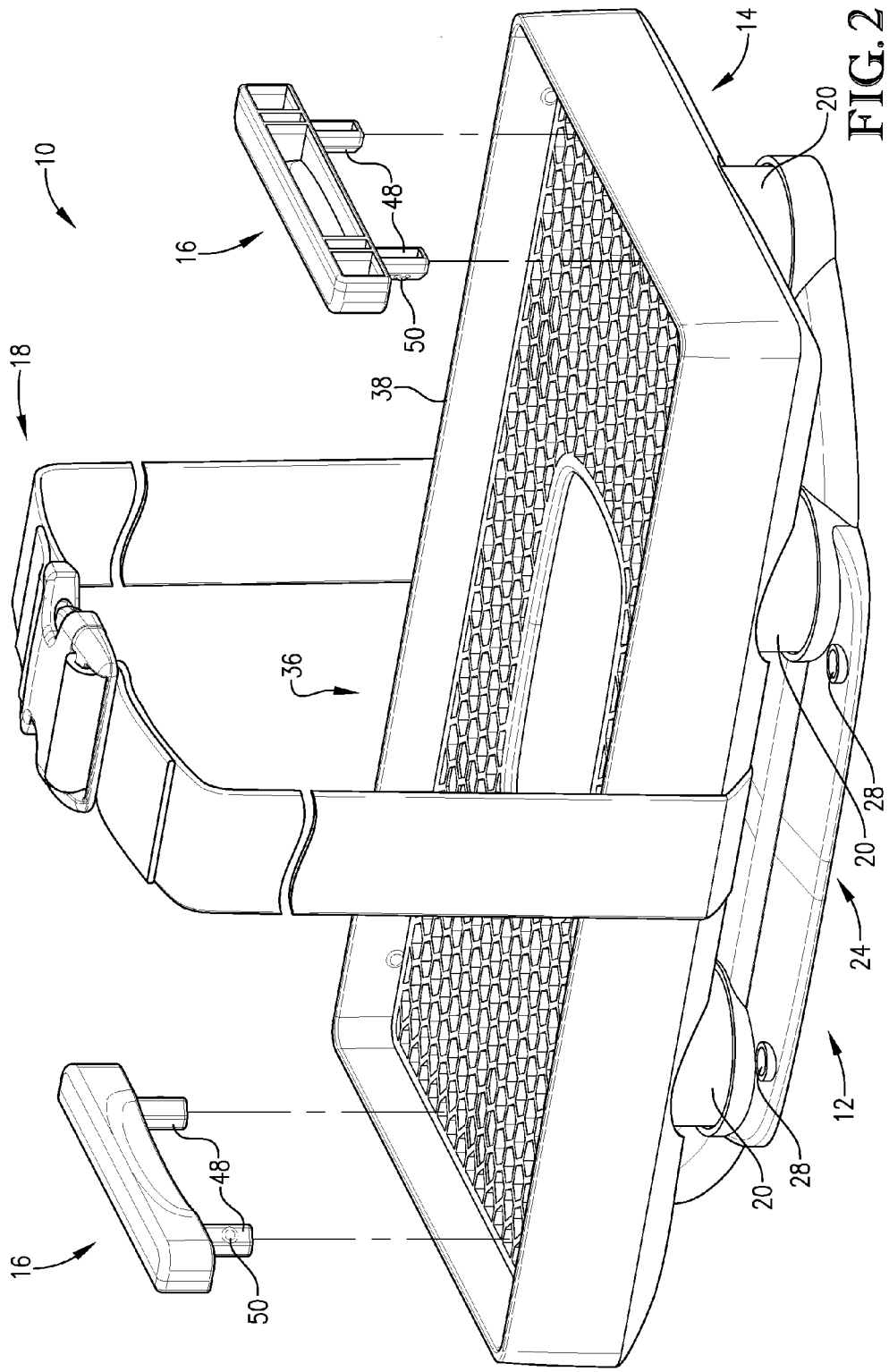
FIG. 2 is another perspective view of the battery holder of FIG. 1 without the battery.

The battery containment plate 14 supports the weight of the battery 22 on the shock absorbing elements 20 and may be formed of corrosion resistant billet aluminum, molded plastic, or any other suitable material. The battery containment plate 14 includes an upper surface 36, a vertically extending lip 38, a plurality of shock absorber fastener holes 40, a plurality of shock absorber wells 42, and a battery securement component guide 44, as shown in FIGS. 2-4. The upper surface 36 receives a bottom portion of the battery 22 thereon and includes a plurality of open-topped cells 46. The open-topped cells 46 retain any leaking battery liquid and may be circular, oval, square, rectangular, hexagonal, irregular shaped, or any other suitable shape. The open-topped cells 46 may be arranged in an orthogonal, radial, or honeycomb array, or any other pattern. Battery liquid that spills over the top edge of one open-topped cell will be retained in the next open-topped cell. The lip 38 retains the bottom portion of the battery 22 on the upper surface 36 and retains any leaking battery liquid not retained by the open-topped cells 46. The lip 38 extends approximately $1/8^{th}$ of an inch to 1 inch upward around the upper surface 36. The shock absorber fastener holes 40 receive shock absorber fasteners therethrough and are spaced from each other in line with the shock absorbing elements 20. The shock absorber fastener holes 40 may be countersunk or counterbore for preventing battery liquid from leaking therethrough when shock absorber fasteners are secured therein. The shock absorber wells 42 receive shock absorbing portions of the shock absorbing elements 20 therein and are large open-topped counterbores extending above the shock absorber fastener holes 40. In one embodiment, the battery containment plate 14 includes six shock absorber wells 42. The battery securement component guide 44 is an elongated recessed region extending from one side to the other side of the bottom of the battery containment plate 14. The battery securement component guide 44 receives a portion of the battery securement component 18 and keeps an alignment of the battery securement component 18 around the battery 22 and the battery containment plate 14. In one embodiment, the battery securement component guide 44 includes one or more grooves positioned in the middle of the bottom of the battery containment plate 14.

The spacers 16 prevent the battery 22 from moving or sliding horizontally on the battery containment plate 14 and include one or more protrusions 48. The spacers may be formed of corrosion resistant billet aluminum, molded plastic, or any other suitable material. The protrusions 48 extend downward and have the same shape or a similar shape as the open-topped cells 46 for inserting the protrusions 48 into one or more selected open-topped cells 46. For example, hexagonal open-topped cells 46 will receive hexagonal or partial hexagonal-shaped protrusions 48. This allows the spacers 16 to be positioned on the upper surface 36 of the battery containment plate 14 at different positions for accommodating larger and smaller batteries. The protrusions 48 each may include a convex nub 50 for friction fitting the protrusions 48 into the open-topped cells 46.

The battery securement component 18 retains the battery 22 on the battery containment plate 14 and may be an adjustable strap, elastic cable, chain, rope, belt, band or any other suitable component. The battery securement component 18 is extended along the battery securement component guide 44 and over the battery 22 and tightened or clamped down so that the battery 22 is retained on the battery containment plate 14, as described below.

The shock absorbing elements 20 isolate the battery 22 from vibrations and shocks generated or transmitted by the vehicle and may be disc-shaped or any other suitable shape. The shock absorbing elements 20 may be Sorbothane® Stud Mounts, rubber, or other suitable component. The shock absorbing elements 20 are positioned between the vehicle mounting plate 12 and the battery containment plate 14 in the shock absorber wells 34 of the vehicle mounting plate 12 and the shock absorber wells 42 of the battery containment plate 14 and in line with the fastener holes 28 of the vehicle mounting plate 12 and the fastener holes 40 of the battery containment plate 14. In one embodiment, the battery holder 10 includes six shock absorbing elements 20 with four elements positioned in a rectangular array and two elements spaced on opposite sides of the rectangular array. The shock absorbing elements 20 include a shock absorption portion 52, a lower shock absorber fastener 54, and an upper shock absorber fastener 56. The shock absorption portion 52 absorbs the vibrations and shocks generated or transmitted by the vehicle and may be formed of Sorbothane® material, rubber, or other suitable material. The lower fastener 54 may be a male or female-type threaded fastener or any other suitable fastener embedded into the bottom of the shock absorption portion 52. The upper fastener 56 may be a female or male-type threaded fastener embedded into the top of the shock absorption portion 52 and extending upwards. The lower fastener 54 and the upper fastener 56 are separated from each other by the shock absorption portion 52 so that vibrations and shocks are not transmitted through the fasteners 54, 56.

The above-described battery holder 10 may be assembled as follows: first, the vehicle mounting plate 12 is positioned on a battery mounting surface or bracket of the vehicle and fastened to the surface or bracket via the vehicle mounting fasteners 30. The shock absorbing elements 20 are then fastened to the vehicle mounting plate 12 via the lower shock absorber fasteners 54. The battery containment plate 14 is then fastened to the shock absorbing elements 20 via the upper shock absorber fasteners 56. The battery 22 is then placed on the upper surface 36 of the battery containment plate 14. The spacers 16 are positioned on the upper surface 36 of the battery containment plate 14 with the protrusions 48 extending into selected open-topped cells 46 with the spacers 16 positioned as close to the battery 22 as possible. The spacers 16 can be omitted for large batteries. The battery securement component 18 is then placed between the vehicle mounting plate 12 and the battery containment plate 14, aligned in the battery securement component guide 44, wrapped over the battery 12, and tightened or cinched so as to secure the battery 22 to the battery containment plate 14.

In one embodiment of the invention, the vehicle mounting plate 12, the battery containment plate 14, and the shock absorbing elements 20 are pre-assembled into a shock base. The shock base is mounted to the vehicle surface. The battery 22 is then placed on the battery containment plate 14 and secured thereto via the battery securement component 18.

In another embodiment of the invention, the shock absorbing elements 20 may be secured directly to the vehicle without the use of a vehicle mounting plate 12.

When the battery holder 10 is assembled, the battery containment plate 14 and the battery securement component 18 secure the battery 22 between them, and the shock absorbing elements 20 mechanically isolate the battery 22 from the vehicle. Because the lower and upper shock absorber fasteners 54, 56 are not connected to each other, the only physical connection between the battery containment plates 14, 16 and the vehicle mounting plate 12 is the shock absorption portion 52. This prevents vibrations and shocks from passing through the fasteners 54, 56 to the battery 22. Specifically, when the shock absorbing elements 20 are subjected to a compressive force, they compress inwardly from the top to bottom and bulge outwardly along their radial sidewalls to absorb and dampen the force. Similarly, when the shock absorbing elements 20 are subjected to a tensional force, they stretch outwardly from top to bottom and compress inwardly along their radial sidewalls to absorb or dampen the force.

The above-described battery holder 10 provides several advantages over conventional battery holders. For example, the battery holder 10 both secures the battery 22 to the vehicle and protects the battery 22 from vibrations and shocks. The open-topped cells 46 retain spilled battery liquid therein. The battery securement component 18 can secure batteries of different heights and the spacers 16 allow different widths or lengths of batteries to be secured to the battery holder 10. The tapered ledges 24, 26 provide an ergonomic contour that prevents other objects from catching on the battery holder 10.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A battery holder for securing and mechanically isolating a battery from a vehicle, the battery holder comprising:
    a vehicle mounting plate for securing the battery holder to the vehicle, the vehicle mounting plate including a plurality of holes for receiving fasteners therethrough;
    a battery containment plate for supporting the battery thereon, the battery containment plate comprising an upper surface having a plurality of open-topped cells for retaining any spilled battery liquid;
    a number of spacers configured to restrict the battery from moving horizontally, the spacers having one or more protrusions configured to be inserted into one or more of the open-topped cells;
    a battery securement component for retaining the battery on the battery holder; and
    at least one shock absorbing element positioned between the vehicle mounting plate and the lower battery containment plate for absorbing shocks and vibrations received from the vehicle so as to at least partially mechanically isolate the battery from the vehicle.

2. The battery holder of claim 1, wherein the protrusions each include a nub for friction fitting the protrusions into the selected open-topped cells.

3. The battery holder of claim 1, wherein the open-topped cells are hexagonal.

4. The battery holder of claim 3, wherein the open-topped cells are arranged in a honeycomb array.

5. The battery holder of claim 1, wherein the at least one shock absorbing component includes a shock absorption portion for absorbing vibrations and shocks received from the vehicle, a lower fastener for connecting the shock absorbing component to the vehicle mounting plate, and an upper fastener for connecting the shock absorbing component to the battery containment plate, the shock absorption portion extending between the lower fastener and the upper fastener.

6. The battery holder of claim 5, wherein the shock absorption portion is formed of Sorbothane® material, rubber, or other suitable shock absorbing material.

7. The battery holder of claim 1, wherein the at least one shock absorbing component comprises six shock absorbing components.

8. The battery holder of claim 7, wherein four of the six shock absorbing components are arranged in a rectangular array and two of the six shock absorbing components are spaced from the rectangular array on opposite sides of the rectangular array.

9. The battery holder of claim 1, wherein the vehicle mounting plate and the battery containment plate each include a plurality of shock absorber wells for receiving at least portions of the shock absorbing components therein.

10. The battery holder of claim 1, wherein the vehicle mounting plate further includes a tapered front ledge and a tapered rear ledge.

11. The battery holder of claim 1, wherein the battery containment plate is formed of molded plastic.

12. The battery holder of claim 1, wherein the battery containment plate is formed of corrosion-resistant billet aluminum.

13. The battery holder of claim 1, wherein the battery containment plate further comprises a battery securement component guide for keeping an alignment of the battery securement component on the battery and the battery containment plate.

14. The battery holder of claim 13, wherein the battery securement component guide is a groove in the battery containment plate.

15. The battery holder of claim 1, wherein the battery securement component is an adjustable strap.

16. The battery holder of claim 1, wherein the vehicle mounting plate, the battery containment plate, and the shock absorbing elements are pre-assembled.

17. A battery holder for securing and mechanically isolating a battery from a vehicle, the battery holder comprising:
- a vehicle mounting plate for securing the battery holder to the vehicle, the vehicle mounting plate including a plurality of holes for receiving fasteners therethrough;
- a battery containment plate for supporting the battery thereon, the battery containment plate comprising:
    - an upper surface having a plurality of open-topped cells for retaining any spilled battery liquid therein;
    - a lip for retaining the bottom portion of the larger battery on the upper surface; and
    - a battery securement component guide;
- a number of spacers for restricting the battery from moving horizontally, the spacers each including one or more protrusions for being inserted into one or more selected open-topped cells depending on the battery size;
- a battery securement component for retaining the battery in the battery holder, the battery securement component guide being configured to keep the battery securement component aligned on the battery and the battery containment plate; and
- at least one shock absorbing element positioned between the vehicle mounting plate and the battery containment plate for absorbing shocks and vibrations received from the vehicle so as to at least partially mechanically isolate the battery from the vehicle.

18. A battery holder for securing and mechanically isolating a battery from a vehicle, the battery holder comprising:
- a vehicle mounting plate for securing the battery holder to the vehicle, the vehicle mounting plate including a plurality of holes for receiving fasteners therethrough;
- a battery containment plate for supporting the battery thereon, the battery containment plate comprising an upper surface having a plurality of open-topped cells for retaining any spilled battery liquid;
- a battery securement component for retaining the battery on the battery holder; and
- at least one shock absorbing element positioned between the vehicle mounting plate and the lower battery containment plate, the at least one shock absorbing element including a shock absorption portion for absorbing vibrations and shocks received from the vehicle so as to at least partially mechanically isolate the battery from the vehicle, a lower fastener for connecting the shock absorbing component to the vehicle mounting plate, and an upper fastener for connecting the shock absorbing component to the battery containment plate, the shock absorption portion extending between the lower fastener and the upper fastener, the lower fastener being a female-type fastener embedded in the bottom of the shock absorbing component and the upper fastener being a male-type fastener embedded in the top of the shock absorbing component and extending from the top of the shock absorbing component, wherein the lower fastener and the upper fastener are not connected to each other but instead are isolated from each other by the shock absorption portion.

\* \* \* \* \*